United States Patent Office 2,722,541
Patented Nov. 1, 1955

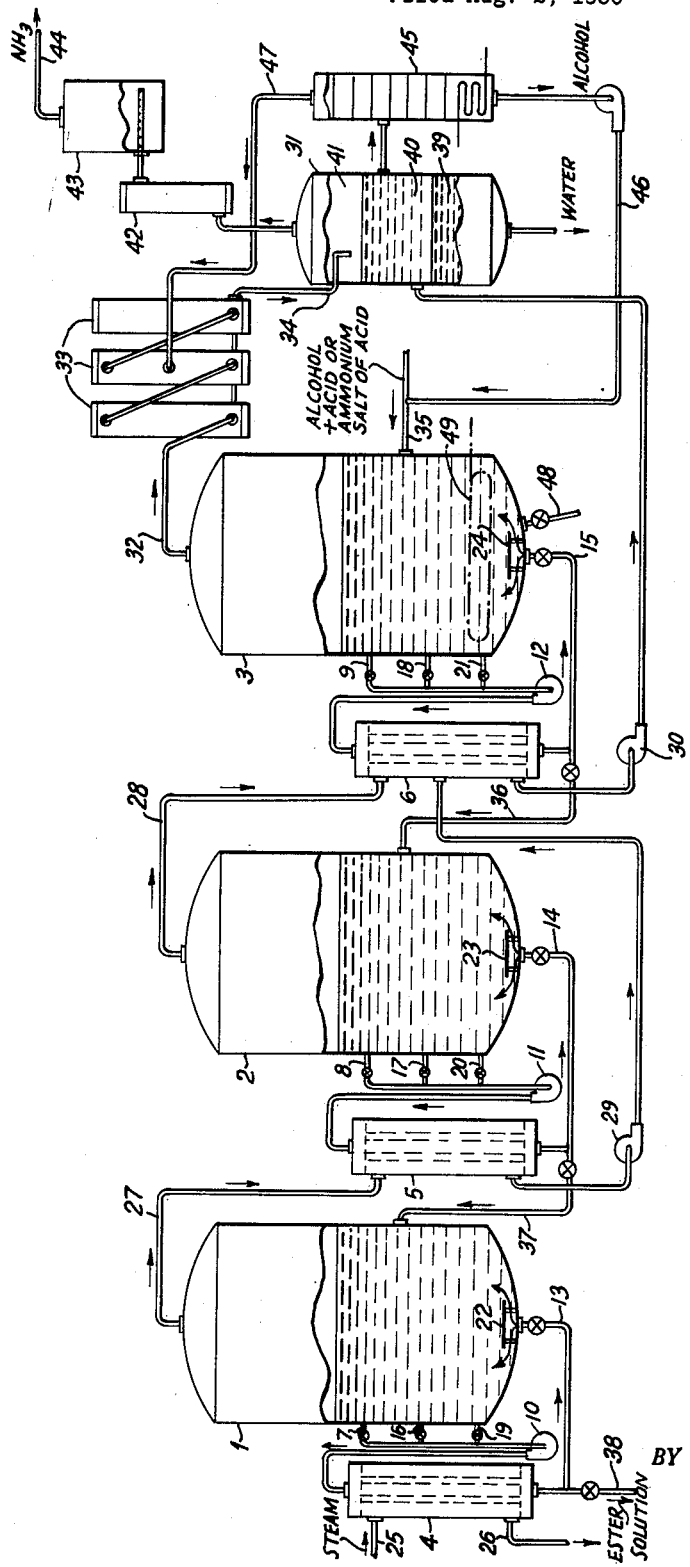

2,722,541

PROCESS OF ESTERIFYING BUTYL LACTATE

William H. Schulz, Jr., and Henry E. Schulz, Winter Haven, and Woodrow W. Richardson, Auburndale, Fla., said William H. Schulz, Jr., and said Woodrow W. Richardson assignors to said Henry E. Schulz Application August 2, 1950, Serial No. 177,256

6 Claims. (Cl. 260—484)

This invention relates to esterification processes and to evaporation apparatus particularly adapted for carrying out such processes.

Although the processes and apparatus of the present invention are applicable to any esterification reaction, they are particularly applicable to the formation of lactic acid esters, and it is in connection with its application to the formation of such esters, and the formation of butyl lactate in particular, that the invention will first be described.

The manufacture of lactic acid by fermentation, and of lactic acid esters therefrom, on a commercial scale has heretofore required the use of relatively pure substrates, such as whey and hydrolyzed starch, due to the recovery problems involved. With less expensive aqueous sugar—containing raw materials, such as sulfite waste, blackstrap molasses or citrus molasses, the suspended insoluble organic solids contained in these materials tend to settle out in the apparatus used for treatment and are especially troublesome in obstructing heat transfer through heat transfer surfaces. It is an advantage of the process and apparatus of the present invention that lactic acid or lactic acid salt solution derived from these inexpensive crude or waste solutions of a fermentable sugar which contain suspended solids can be economically subjected to esterification.

In the preparation of solutions of lactic acid, free or combined as a salt, to be subjected to esterification according to the process of the present invention, an aqueous solution of a sugar capable of fermentation to lactic acid, which may be one of the crude sugar solutions referred to above, is subjected to a lactic acid forming fermentation in the known manner. Thus the solution may be brought to a sugar concentration between about .5 per cent and about 10 per cent, preferably about 8 per cent, and Lactobacillus or other lactic acid producing organism may be added, together with known nutrients, such as malt sprouts or steepwater. The fermentation proceeds most readily at temperatures between about 40° C. and about 60° C. and particularly at temperatures between 50° C. and 52° C.

As sugar is converted to lactic acid, the pH of the solution tends to decrease to a value at which the fermentation stops unless a sufficient amount of a neutralizing substance is added. The neutralization may conveniently be accomplished by continuously or periodically introducing ammonia into the fermenting mixture, as by means of an indicating and controlling pH meter. The resulting product is an aqueous solution of lactic acid largely neutralized with ammonia to form ammonium lactate.

This ammonium lactate solution may be esterified directly with an alcohol by the process of the present invention. The solution has a non-corrosive pH and can be treated in equipment formed of ordinary mild steel. However it is often more desirable to subject the solution to one or more additional treatments prior to esterification.

One such additional treatment is to concentrate the solution in an evaporator which, particularly with solutions containing suspended solids, may be one of the evaporators of the present invention to be described in more detail below. During this concentration, a substantial amount, up to 60 per cent to 80 per cent, of the water in the solution can be driven off together with up to 40 per cent to 50 per cent of the ammonia present as ammonium lactate. This ammonia is sufficiently pure to be recycled directly to fermentation.

During concentration, the pressure maintained in the evaporator by the heating of the solution may be atmospheric but is preferably superatmospheric since the solutions concentrated at sufficiently high pressure possess a pH which is high enough to permit both the concentration and esterification to be carried out in ordinary mild steel equipment, despite the fact that more ammonia is given off during high pressure concentration than during concentration at atmospheric pressure. Ordinarily it is not practical to operate at pressures above 100 pounds per sq. in. above atmospheric, due to apparatus limitations. In order to obtain the benefit of a high pH in the concentrated solution, it is desirable to operate at a pressure of at least 25 pounds per sq. in. and preferably at least 50 pounds per sq. in. A pressure of about 60 pounds per sq. in. is a convenient operating pressure. However, where acid-resistant equipment is to be used for the subsequent esterification, as where the ammonium lactate is to be acidified before esterification, it may be satisfactory to operate at atmospheric pressure.

When the ammonium lactate solution is derived from a crude sugar solution containing suspended solids, another additional treatment which may be applied to the solution, whether concentrated or not, is the separation of a large part of the suspended solids from the remainder of the solution by means of a solvent extraction. In this extraction, any substance which is a solvent for the liquid portion of the solution can be employed. Alkanols containing up to 3 carbon atoms, namely methyl alcohol, ethyl alcohol, propyl alcohol and isopropyl alcohol, have been found particularly suitable as solvents.

The solvent extraction is most conveniently carried out in a tower in which the ammonium lactate solution is continuously introduced just below the top and the solvent is continuously introduced just above the bottom. The solvent, having the liquid portion of the ammonium lactate solution dissolved therein, is continuously removed from the top of the tower. The suspended solids settle in the tower countercurrent to the ascending solvent and, with the ammonium lactate substantially completely washed out by the solvent, are continuously removed from the bottom of the tower. The solvent carried off with the settled solids can be recovered by distillation. The amount of solvent used for solvent extraction relative to the amount of ammonium lactate solution may be any suitable amount, as for instance between about 10 per cent and about 200 per cent by volume.

The ammonium lactate solution produced as described above, which may contain suspended solids and which may have been subjected to either or both of the treatments of concentration and solvent extraction, may be subjected, with or without prior acidification, to the esterification process of the present invention in the apparatus of the present invention.

The accompanying drawing is a front elevation, partly in section, of the apparatus of the present invention.

The esterification is carried out in an evaporator having one or more effects similar to those of the triple effect evaporator shown in the drawing. Each effect is made up of a closed evaporating vessel 1, 2, 3, heated by an external tubular heat exchanger 4, 5, 6. The liquid being treated in each evaporating vessel is continuously circulated between the vessel and the corresponding heat exchanger by being withdrawn from the vessel at a point below but near the surface of the liquid through a withdrawal duct 7, 8, 9.

The withdrawn liquid is circulated by means of a pump 10, 11, 12 through the heat exchanger 4, 5, 6 and back to the bottom of the evaporating vessel through a return duct 13, 14, 15. Other withdrawal ducts 16, 17, 18, 19, 20, 21, situated below withdrawal ducts 7, 8, 9, are provided for draining the evaporating vessel or operating at a lower liquid level but these other ducts are normally closed by valves contained therein.

Just above the point at which the return duct 13, 14, 15 introduces the liquid into the bottom of the evaporating vessel, a baffle plate 22, 23, 24 is positioned so that the liquid is deflected and is distributed radially across the bottom of the evaporating vessel.

This type of construction minimizes the difficulty involved in handling solutions containing substantial amounts of suspended solids. The solids tend to settle in the body of the liquid in the evaporating vessel. By withdrawing the liquid to be circulated through the heat exchanger from near the upper surface of the body of liquid, that portion of the solution is circulated which is free from an excessive amount of solids. Therefore, there is little tendency for the heat transfer surfaces in the heat exchanger to become fouled with deposited solids. This fouling of heat transfer surfaces is further reduced by the use of the external heat exchanger in which the liquid to be heated is continually flushing the heat exchange surfaces, as contrasted with heating a static body of liquid in the evaporating vessel, as by the use of a steam jacket.

The accumulation of a heavy deposit of settled solids in the bottom of the evaporating vessel is avoided by the reintroduction of the circulated liquid at the bottom of the vessel and by the use of the baffle plate to distribute the liquid radially across the bottom of the vessel. This radial flow is sufficient to sweep deposited solids from the bottom surface of the vessel.

The heat exchanger 4 of the first effect is heated by steam introduced at 25, the condensate from the steam being withdrawn at 26. The vapor evolved from the liquid in the evaporating vessel 1 of the first effect is used for heating the heat exchanger 5 of the second effect. The vapor is carried from the top vessel 1 to the heat exchanger 5 by means of duct 27. Similarly the heat exchanger 6 of the third effect is heated by the vapor from the vessel 2 of the second effect the vapor being carried by duct 28.

The condensate from the vapor introduced into the heat exchanger 5 of the second effect is pumped by means of pump 29 to the heat exchanger 6 of the third effect. The condensate from heat exchanger 6 is pumped by means of pump 30 to a separatory tank 31. Vapor from the third effect vessel 3 passes through duct 32 to condenser 33 and the condensate, together with permanent gases, is discharged from the condenser into separatory tank 31 through duct 34.

In carrying out the esterification reaction in the multiple effect evaporator, the mixture to be esterified, such as an ammonium lactate solution prepared as described above, is continuously introduced into the third effect evaporating vessel 3 through duct 35. A portion of the partially esterified liquid from the third effect, which is being circulated between the evaporating vessel 3 and heat exchanger 6, is continuously drawn off after it has passed through the heat exchanger and is introduced into the evaporating vessel 2 of the second effect through duct 36. The main body of the circulating liquid is returned to the third effect evaporating vessel through duct 15 as described above. Similarly, a portion of the circulating liquid from the second effect is continuously drawn off through duct 37 and introduced into the first effect evaporating vessel 1. A constant liquid level can be maintained in each evaporating vessel with an automatic float control valve (not shown) acting on the duct which introduces the liquid. A portion of the circulating liquid from the first effect can be continuously withdrawn through duct 38 and constitutes the esterified product. The ester can be recovered from this discharged liquid by any suitable means, as by distillation.

By using this system of back feeding wherein the material to be esterified is fed into the last effect and then successively into earlier effects and wherein the esterified product is withdrawn from the first effect, the esterification mixture is subjected to the higher temperature and pressure in those vessels in which the ester content is the higher.

Where, for example, butyl lactate is to be formed from an ammonium lactate solution which has been derived from a crude sugar solution, such as citrus molasses, and which has been subjected to concentration but not to solvent extraction, the esterification mixture introduced into the third effect at 35 will consist of butyl alcohol together with the aqueous solution of ammonium lactate and lactic acid containing suspended solid matter. A sufficient excess of alcohol over that required to esterify with the ammonium lactate and lactic acid is used to compensate for distillation during esterification. Ordinarily from 2 to 10 times the alcohol stoichiometrically equivalent to the ammonium lactate and lactic acid is used.

The vapors given off in the evaporating vessels 1, 2, 3 and ultimately collected in separatory tank 31 after condensation consist chiefly of water originally in the ammonium lactate solution, water formed by esterification, ammonia released by esterification of ammonium lactate, butyl alcohol which distills off, and a small amount of butyl lactate.

Since butyl alcohol is only partially miscible with water, the liquid in the separatory tank 31 separates into a water layer 39 on the bottom and an alcohol layer 40 on top. The non-condensible gas, consisting chiefly of ammonia contaminated with small amounts of sulphur dioxide and other gases, collects in the space 41 above the liquid. This gas is withdrawn from the separatory tank, and, after being further cooled by a passage through a heat exchanger 42, is passed through a scrubber 43, containing an aqueous solution of an alkaline material, such as sodium hydroxide or lime, to remove the undesirable contaminating gases. The ammonia discharged at 44 is of sufficient purity to be recycled to the fermentation step referred to above.

Liquid from the water layer 39 is withdrawn from the bottom of the separatory tank. The small amount of butyl alcohol and butyl lactate dissolved in the water can be recovered by distillation before the water is discarded.

Liquid from the alcohol layer 40 is withdrawn and passed to distilling column 45 where it is stripped of the water and ammonia which are dissolved in it. The dry alcohol, having a small amount of butyl lactate dissolved in it is recycled from the bottom of the column to the third effect evaporating vessel through duct 46. The water and ammonia vapors pass from the top of the distilling column to condenser 33 through duct 47.

The butyl lactate, which is the product of the esterification reaction and which is contained in the liquid discharged at 38 from the first effect, can be recovered by steam distillation, vacuum distillation or destructive distillation. When steam distillation or vacuum distillation is employed, the solution which remains has a substantial content of ammonium lactate and lactic acid and can be recycled to the esterification.

During the continuous esterification in the multiple stage evaporator, the greater part of the suspended solids introduced into the last effect evaporator vessel remains therein since the liquid withdrawn for passage to the earlier effects is taken from the upper part of the liquid body which is relatively free of suspended solids. When the accumulation of solids in the lower portion of the liquid body becomes excessive, it is necessary that this solid residue be removed. This can be done without interfering substantially with continuous operation by halting the circulation through the heat exchanger and withdrawing the thick suspension of solids through the duct 48. Alcohol and ammonium lactate can be recovered from the withdrawn solids.

Alternatively, continuous operation can be discontinued and the residue can be removed by first steam distilling off the butyl alcohol and butyl lactate in the vessel, decanting off any liquid which remains and then opening the vessel and removing mechanically the solid residue at the bottom. When this method of operation is to be employed, a perforated duct 49 is provided at the bottom of the vessel for introducing live steam for the steam distillation. The decanted liquid contains ammonium lactate which can be recovered by recycling to the concentration step referred to above.

For carrying out the esterification referred to above, any convenient pressure can be maintained in the evaporating vessels. Ordinarily pressures above 100 pounds per sq. in. will not be used because of apparatus limitations. Pressures between about 1 pound per sq. in. and 25 pounds per sq. in. will ordinarily be convenient for use, with the temperatures in the evaporating vessels being maintained at the values required for maintaining the desired pressures.

Where the ammonium lactate to be esterified has a value of pH which renders it non-corrosive to ordinary steel equipment, it is ordinarily desirable that the esterification be carried out without the addition of a mineral acid to hasten the esterification. However, since the addition of a mineral acid will cause esterification to take place in roughly ½ the time required without the addition of acids, it may be desirable in areas where fuel cost is high to add the acid despite the necessity of employing more expensive acid-resisting equipment.

For this purpose, any mineral acid, such as sulfuric acid, hydrochloric acid or nitric acid can be used. It is added in an amount sufficient to react with all the ammonia present as ammonium lactate, together with a slight excess, of the order of one per cent to 5 per cent of the solution present, to act as a catalyst.

The esterification has been described as carried out continuously in a multiple effect evaporator. It is apparent that the reaction can also be carried out in the same apparatus as a batch or semi-continuous process. It is also possible to obtain the advantage of this type of apparatus in handling solutions containing suspended solids, while sacrificing the multiple effect economy by carrying out the esterification in a single effect evaporator having the same construction as each of the effects of the multiple effect evaporator described above.

When the ammonium lactate solution to be esterified has been solvent extracted and therefore contains solvent in addition to the other ingredients, the esterification reaction can be carried out in essentially the same way as described above. When the solvent used for extraction is an alcohol which is the same as the one to be used for esterification, the solvent can be used as part or all of the esterifying alcohol. When the solvent is in alcohol other than that to be used for esterification, it is necessary that the esterifying alcohol be higher boiling than the solvent alcohol so that any of the solvent alcohol which esterifies with the ammonium lactate or lactic acid will eventually be displaced by the esterifying alcohol.

When solvent is present in the esterification mixture, the solvent will be carried off in the vapor from the evaporating vessels together with the water, ammonia and esterifying alcohol. It is therefore necessary to modify the procedure for recovering the constituents of the vapor after condensation. Adequate separation can be accomplished by distillation; and the solvent can be recycled to solvent extraction, the esterifying alcohol can be recycled to esterification and the ammonia, after purification, can be recycled to fermentation.

For the esterification of ammonium lactate or lactic acid by the procedure described above, any primary or secondary alcohol, that is any alcohol having at least one hydrogen atom on the carbon atom to which the alcoholic hydroxyl group is bonded, can be used in place of the butyl alcohol referred to above. When this alcohol is completely miscible with water, it will not be possible to use the liquid separation in separatory tank 31 described above, but the recovery of the alcohol can be accomplished by distillation. Alkanols, particularly those containing up to 6 carbon atoms, are particularly suited to this esterification procedure.

It is apparent that the esterification procedure described above is applicable not only to the formation of lactic acid esters but also to any other esterification. With other esterifications there can be obtained the same advantages of multiple effect economy and of avoidance of fouling by suspended solids when crude materials containing such suspended material are esterified. As indicated above, the apparatus described above is advantageously used for the concentration step referred to above, as well as for esterification. For concentration, a single effect evaporator may be used. The advantage of an evaporator of this construction in avoiding fouling due to suspended solids is obtained during concentration as well as during esterification.

The invention has been described in terms of its specific embodiments and, since certain modifications and equivalents may be apparent to those skilled in the art, this description is intended to be illustrative of and not necessarily to constitute a limitation upon the scope of the invention.

What is claimed is:

1. The method of forming an ester from a crude aqueous solution of an organic acid containing a substance containing suspended and insoluble solids, which method comprises continuously introducing said solution, together with a sufficient amount of an alcohol to esterify with all of the free and combined organic acid in said solution, into the last effect of a multiple effect evaporator, in which a substantially fixed level of liquid is maintained, continuously withdrawing liquid from said last effect, and continuously passing the withdrawn liquid successively through the earlier effects in which substantially fixed liquid levels are also maintained, continuously removing ester-containing liquid from the first effect, simultaneously heating the liquids in each evaporating vessel and retarding the accumulation of organic solids in the bottom of the evaporating vessels by withdrawing liquid from the upper portion of the body of liquid in each vessel, passing the liquid through a heat exchanger, returning it to the bottom of its respective vessel and distributing it tangentially in substantially all directions across the bottom of the vessel with sufficient velocity to retard accumulation of solids in the bottom of the vessel, utilizing the heat of the vapors evolved in each effect except the last to supply heat to the next succeeding effect and supplying externally generated heat to the heat exchanger of the first effect.

2. The method described in claim 1 wherein the organic acid containing substance is ammonium lactate and the alcohol is butyl alcohol and wherein the alcohol in the distillate from each of the effects is recovered, freed from water and returned to the last effect.

3. The method described in claim 1 wherein the esterifiable ingredients are lactic acid and an alcohol.

4. The method described in claim 1 wherein the esterifiable ingredients are ammonium lactate and an alcohol.

5. The method described in claim 1 wherein the esterifiable ingredients are ammonium lactate and butyl alcohol.

6. The method of forming an ester from a crude aqueous medium containing a mixture of ingredients esterifiable to form said ester and containing suspended insoluble solids, which comprises introducing said medium into a closed evaporator maintained at an elevated temperature, continuously withdrawing liquid from just below the liquid level in said evaporator, passing said withdrawn liquid through a heat exchanger and returning it to the bottom of said evaporator, said evaporator being equipped with a baffle plate against which said returned liquid is directed in such manner that it is distributed radially in substantially all directions across the bottom of the evaporator so as to prevent accumulation of solids, supplying heat to said heat exchanger, and continuously withdrawing from said evaporator the vapors generated therein.

References Cited in the file of this patent

UNITED STATES PATENTS

| | | |
|---|---|---|
| 1,603,703 | Mitchel | Oct. 19, 1926 |
| 1,908,708 | Krchma et al. | May 16, 1933 |
| 2,290,926 | Weisberg et al. | July 28, 1942 |
| 2,331,094 | Loder | Oct. 5, 1943 |
| 2,390,140 | Weisberg et al. | Dec. 4, 1945 |
| 2,406,648 | Weisberg et al. | Aug. 27, 1946 |
| 2,488,598 | Lockman | Nov. 22, 1949 |
| 2,510,233 | Kermer | June 6, 1950 |
| 2,565,487 | Filachione et al. | Aug. 28, 1951 |

OTHER REFERENCES

Badger et al.: "Elements of Chemical Eng." (1936), 2nd ed., pp. 210–2, 225–9.

Brown et al.: "Unit Operations" (1950), pgs. 481–3.